United States Patent [19]

Kimijima et al.

[11] Patent Number: 5,709,918
[45] Date of Patent: Jan. 20, 1998

[54] INFORMATION INDICATOR AND INFORMATION INDICATING LABELS

[75] Inventors: Takao Kimijima, Kodaira; Hitoshi Sakashita, Misato, both of Japan

[73] Assignees: Bridgestone Corporation; Lintec Corporation, both of Japan

[21] Appl. No.: 533,372

[22] Filed: Sep. 25, 1995

[30] Foreign Application Priority Data

Sep. 26, 1994 [JP] Japan ................................ 6-257585

[51] Int. Cl.⁶ ............................................ B32B 7/00
[52] U.S. Cl. .................... 428/40.1; 283/81; 428/141; 428/156; 428/161; 428/172; 428/173; 428/353; 428/323; 428/354; 428/904.4
[58] Field of Search ................................ 428/354, 343, 428/353, 323, 904.4, 40.1, 141, 156, 161, 172, 173; 283/81

[56] References Cited

U.S. PATENT DOCUMENTS

| | | | |
|---|---|---|---|
| 3,658,635 | 4/1972 | Eustice | 428/425.8 |
| 4,056,161 | 11/1977 | Allen, Jr. | 181/290 |
| 4,278,726 | 7/1981 | Wieme | 428/229 |
| 4,347,280 | 8/1982 | Lau et al. | 428/304.4 |
| 4,981,737 | 1/1991 | Rico | 428/40.1 |
| 5,358,772 | 10/1994 | Nakagawa | 428/148 |
| 5,512,343 | 4/1996 | Shaw | 428/42.1 |

FOREIGN PATENT DOCUMENTS

| | | |
|---|---|---|
| 0 320 676 | 6/1989 | European Pat. Off. . |
| 2 631 667 | 11/1989 | France . |
| 52-81463 | 9/1977 | Japan . |
| 513171 | 10/1939 | United Kingdom . |
| 2 113 346 | 8/1983 | United Kingdom . |
| WO82/04454 | 12/1982 | WIPO . |

OTHER PUBLICATIONS

Japanese Industrial Standard, Surface Roughness Definitions and Designation, JIS B 0601 (1994).

Article entitled "*Frequency And Loss Factors of Sandwich Beams Under Various Boundary Conditions*", D.K. Rao, Journal Mechanical Engineering Science, vol. 20, No. 5, 1978, pp. 271–282.

*Primary Examiner*—Nasser Ahmad
*Attorney, Agent, or Firm*—G. Peter Nichols; Brinks Hofer Gilson & Lione

[57] ABSTRACT

An information indicator used for a tire production control label or the like is provided with a film-type substrate formed of a heat-resistant resin. An information indicating surface onto which a recognizable indication indicating specified information is printed is formed on one surface of the substrate, and a pressure sensitive adhesive layer is formed via a primer layer on the other surface of the substrate. The information indicating surface is formed so as to have a surface roughness whose arithmetical mean deviation of the profile determined in JIS B 0801 lies between 0.5 and 5 μm, and an indication such as a bar code, characters, figures, symbols or drawings is attached to the information indicating surface. With the information indicator formed in this way, the indication does not become blurred or erased even under the high temperatures and high pressures during vulcanization.

10 Claims, 2 Drawing Sheets

INFORMATION INDICATOR AND INFORMATION INDICATING LABELS

BACKGROUND OF THE INVENTION

1. Field of the Invention

The present Invention relates to information indicators which are used as information indicating labels to be stuck onto vulcanized rubber moldings such as tires.

2. Description of the Background Art

Conventionally, information indicating labels on which a bar code or control number is indicated have been used when tires are manufactured under production control. The information indicating label is stuck onto a rim of an unvulcanized tire, and the unvulcanized tire is then vulcanized under high temperature and high pressure. It is thus required of such Information indicating labels that they have a strong adhesive force such that the position in which they are stuck does not slip and such that they do not come off, even when they are placed in a high-temperature, high-pressure environment. Further, it is also required that the indication of the information which is indicated on the label should not become blurred or erased under such environment.

In order to indicate such information on the information indicating label, it is preferable to use a thermal transfer ribbon or thermally sublimating ink in view of the costs thereof. However, since printed characters made by the ribbon or ink are likely to be erased due to the heat applied during vulcanization, there is a case that it will be difficult or impossible to check the indicated information visually.

In view of such a drawback, photographic printing or the like using silver salt has been used instead of the abovementioned methods. According to the photographic printing, it is possible to produce indication which is not erased by heat. Further, other methods for covering and protecting the information indicating part have also been proposed, which include one method in which a protective film such as a polyester film is adhered onto the information indicating surface on which the information has already been inscribed, using a heat-resistant adhesive, and another method in which a protective layer is formed onto the information indicating surface by applying a clear resin onto the surface and then hardening it.

The inscribed information formed by means of the above described photographic printing using silver salt has adequate heat resistance. On the other hand, however, it has the disadvantage that the inscription processes are complicated, so that the manufacturing costs are unavoidably increased.

Further, in the other methods using the protective film which is adhered onto the information indicating surface or the protective layer which is formed by applying resin, another process that adheres the protective film onto the information indicating surface or forms the protective layer thereon is required to be carried out after the information has been inscribed, thus leading to the increased number of processes. Furthermore, according to these methods, it is not possible to inscribe the information onto the information indicating labels at the site of manufacture of a tire (adherend). Therefore, it is required to perform additional steps that include preparing completed labels in advance, selecting the appropriate one from these labels and then adhering it to the tire. These steps become restriction in the manufacturing processes.

SUMMARY OF THE INVENTION

The object of the present invention is to provide an information indicator which has a simple construction and with which the indication does not become blurred or erased even when they are placed in a high-temperature environment.

In order to achieve the abovementioned object, an information indicator according to the present invention comprises a film-type substrate having one surface which is constituted into an information indicating surface and the other surface which is provided with a pressure sensitive adhesive layer, wherein the information indicating surface is formed so as to have a surface roughness whose arithmetical mean deviation of the profile determined in JIS B 0601 lies between 0.5 and 5 μm.

According to the information indicator of the present invention, since the surface roughness of the information indicating surface is set as desired, it is possible to provide the information indicator which has excellent printing properties with a simple construction, without using a special indicating method or providing a protective layer for covering the indication. Further, the information indicated on the thus constructed information indicator does not blur or run or become erased or transferred even when it is placed in a high-temperature environment or in a high-temperature and pressure environment.

In particular, according to the present invention, since it is not necessary to adhere any covering film or form any protective layer after applying the indication to the information indicating surface, it is possible, for example in the manufacturing process for a tire, to apply the indication to the information indicator using a normal information indicating means such as a printer, at the manufacturing site. With this result, it is possible to perform the process efficiently, and furthermore its scope of application is increased.

Preferably, the abovementioned substrate is formed of a heat-resistant resin, and more preferably is formed of a nontransparent resin to which pigment has been added.

Further, with the information indicator according to the present invention, a primer layer for increasing the adhesive strength between the substrate and the pressure sensitive adhesive layer may be provided therebetween.

In this way, if such a primer layer which increases the adhesive strength is provided between the substrate and the pressure sensitive adhesive layer, the adhesive strength of the information indicator onto the adherend is increased. As a result, it is possible to prevent peeling and separation from being caused during manufacture, use, transport and storage of the adherend, for instance. The primer layer is preferably formed of a material whose main component is resorcinol formaldehyde resin or resorcinol formaldehyde latex resin.

Further, with the information indicator according to the present invention, it is possible to provide a light-reflecting layer on the other surface of the substrate.

Furthermore, with the information indicator according to the present invention, it is also possible to provide an adhesivity imparting layer on the information indicating surface of the substrate in order to improve adhesivity of the surface.

Another aspect of the present invention is directed to an information indicating label for use in an unvulcanized rubber from which a rubber molding is formed, which comprises: a film-type substrate having a first side and a second side which is on the opposite side to the first side; an information indicating surface which is provided on the first side of the film-type substrate and on which identifiable information which represents specified information is applied, the information indicating surface having a surface roughness whose arithmetical mean deviation of the profile determined in JIS B 0601 lies between 0.5 and 5 μm; and a pressure sensitive adhesive layer provided on the second side of the film-type substrate.

The other aspect of the present invention is directed to a label for production control of rubber moldings. The label comprises a film-type substrate formed from a heat-resistant resin having a first side and a second side which is on the opposite side to the first side; an information indicating surface which is provided on the first side of the film-type substrate and on which an identifiable indication which indicates specified information is printed, wherein microscopic irregularities of a prescribed roughness are formed on the information indicating surface, in which the size of the irregularities is set such that the indication printed on the information indicating surface is scarcely blurred or erased even under high temperatures and high pressures during vulcanization, and such that the recognizability and detectability of the indication on the rubber molding is not impaired; and a pressure sensitive adhesive layer which is provided on the second side of the film-type substrate, the pressure sensitive adhesive layer being adapted to be adhered to the unvulcanized rubber from which the rubber molding is formed.

Other aspect of the present invention is directed to a production control method for the production of rubber moldings. The production control method comprises the steps of: (a) preparing a label which comprises a film-type substrate formed from a heat-resistant resin, an information indicating surface which is provided on one surface of the substrate and which has a surface roughness whose arithmetical mean deviation of the profile determined in JIS B 0601 lies between 0.5 and 5 μm, and a pressure sensitive adhesive layer which is provided on the other surface opposite to the one surface of the substrate; (b) printing information specifying the product on the information indicating surface of the label; (c) adhering the label to a specified position on unvulcanized rubber via the pressure sensitive adhesive layer of the label; and (d) producing a rubber molding by vulcanizing the unvulcanized rubber to which the label is adhered under high temperature and high pressure; wherein production control of the rubber molding is performed based on the indication printed on the label.

Other objects, structures and results of the present invention will become apparent from the following description of the preferred embodiments when taken in conjunction with the accompanying drawings.

DETAILED DESCRIPTION OF THE PREFERRED EMBODIMENTS

A detailed description of the information indicator of the present invention will now be given below with reference to the preferred embodiments shown in the attached drawings.

Figure 1:
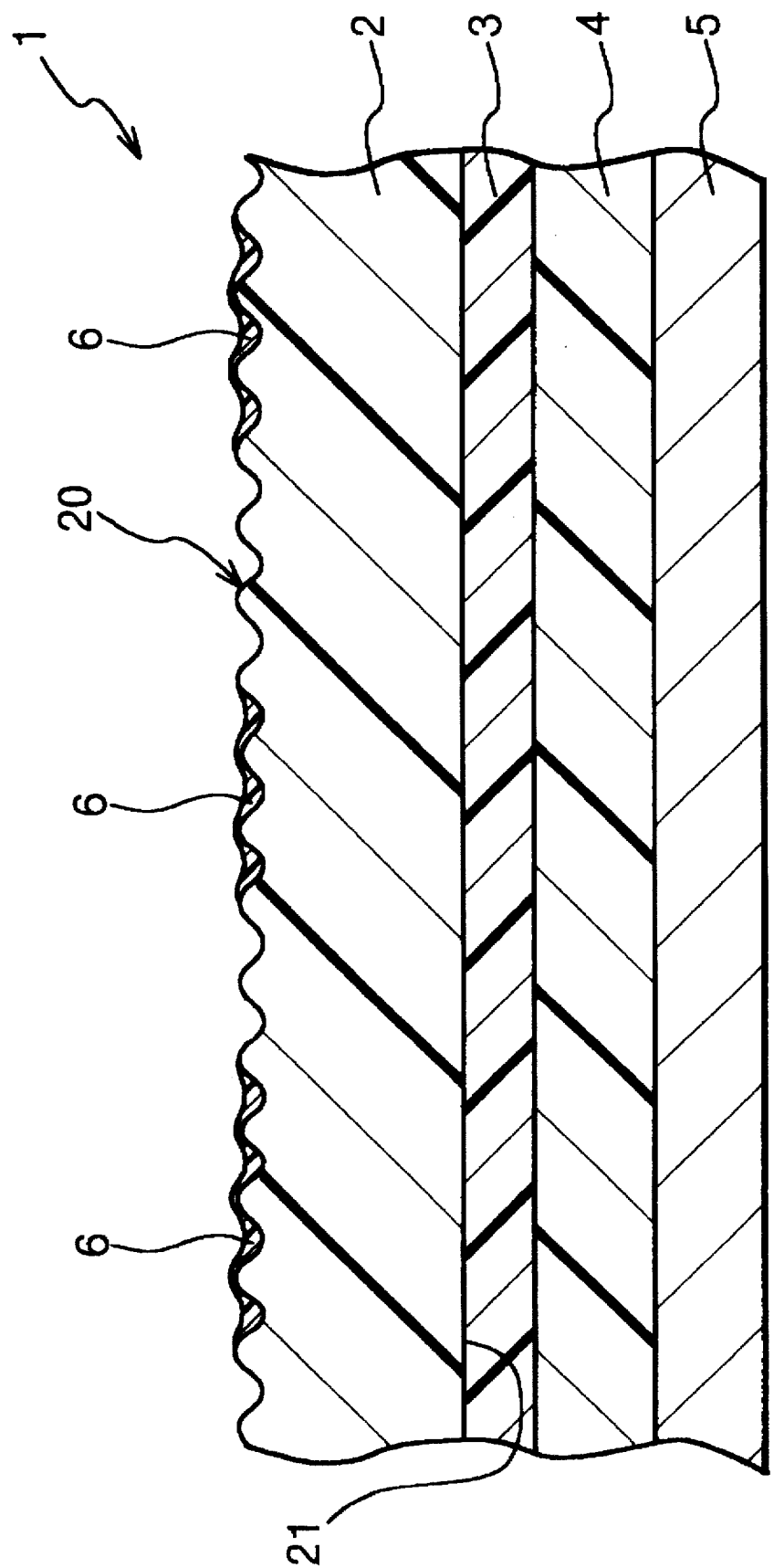
FIG. 1 is an enlarged cross sectional view which shows an embodiment of the information indicator according to the present invention.

FIG. 1 is an enlarged cross sectional view showing an embodiment of the information indicator according to the present invention. In this embodiment, this information indicator is an information indicating label which is used as a tire production control label. As shown in the drawing, the information indicator 1 of the present invention has a film-type substrate 2. One surface which is on a first side of the substrate 2 forms an information indicating surface 20. Further, on the other surface 21 which is on a second side of the substrate 2, a pressure sensitive adhesive layer 4 is formed via a primer layer 3. Furthermore, a release liner 5 is stuck onto the pressure sensitive adhesive layer 4. On the information indicating surface 20, there are provided identifiable indication 6 which indicates specified information. Examples of such indication include a bar code, a two-dimensional symbol code or other codes, characters, figures, symbols and drawings and the like.

The substrate 2 is preferably formed from a heat-resistant resin, and in particular is constructed from a resin whose melting point (Tm) or thermal distortion temperature (softening point) is 160° C. or more, and more preferably 180° C. or more. Examples of such resins include polyesters such as polyethylene terephthalate and polybutylene terephthalate, and ABS resins, polyarylate, polycarbonate, polyamide, polyimide, polyamidoimide, polyacetal, polyphenylene oxide, polysulfone, polyethersulfone, polyphenylene sulfide and polyether ether ketone, or copolymers and polymer alloys containing one or more of these materials.

Further, as for the substrate 2, it is preferable to use a nontransparent film-type material which is obtained by adding (or mixing) a pigment (or dye) into a resin material for giving a nontransparent property thereto. By doing so, the recognizability of the indication 6 and reading accuracy of the indication 6 by means of a reading device are both improved. Examples of colors of pigments which can be added include white or colors such as red, blue, yellow, green or brown, or metallic colors. If the indication 6 is indicated by black or a deep color, then it is preferable for the color of the pigment to be white or a relatively light color. Examples of such white pigments include powdered titanium oxide.

In order to produce or indicate such indication 6 on the information indicating surface 20 of the substrate 2, it is possible to use a thermally sublimating ink or a heat transfer printer. Of course, other appropriate methods can be used for producing such indication.

The thickness of the substrate 2 is not particularly restricted, but it is preferred that it lies between approximately 25 and 250 μm.

Microscopic irregularities are formed on the information indicating surface 20 of such a substrate 2. Such microscopic irregularities are formed so as to have a surface roughness whose arithmetical mean deviation of the profile determined in JIS B 0601 (hereinafter, referred to as "Ra") lies between 0.5 and 5 μm, and more preferably between 0.7 and 3.5 μm.

If the surface roughness "Ra" is in the abovementioned range, then the ink or the like with which the indication 6 is formed enters the indentations of the information indicating surface 20 and the amount of the ink which spreads sideways is small. As a result, blurring is not liable to occur. Further, since the printed ink surface has microscopic irregularities following the indentations of the information indicating surface 20, the contact surface area of the ink with the information indicating surface 20 is much larger than the contact surface area with the vulcanizing mold. With this result, the ink is not liable to be transferred to the mold.

On the other hand, if the surface roughness "Ra" of the information indicating surface 20 is less than 0.5 μm, then the indication 6 will be likely to blur, run or be erased when it is placed in a high-temperature environment. Furthermore, if the surface roughness "Ra" exceeds 5 µm, then the information indicating surface 20 will be too rough, so that recognizability and detectability will be poor.

In this regard, it should be noted that methods which can be cited as examples of methods for imparting the surface roughness to the information indicating surface 20 include sand matt processing, matt coat processing or minglement matt processing.

The main purpose of providing such a primer layer 3 is to increase the adhesive strength between the substrate 2 and the pressure sensitive adhesive layer 4 (or light-reflecting layer 7 described below). Provided that it achieves this purpose, the composition of the primer layer 3 is not particularly limited. However, it is preferable to form the primer layer 3 from a material with which a particularly high adhesive strength can be obtained. Examples of such a material include materials whose main component is resorcinol formaldehyde resin or resorcinol formaldehyde latex resin.

The abovementioned resorcinol formaldehyde resin is a resin in which resorcinol and formaldehyde are condensed, and there are a novolac type one in which they are condensed using an acidic catalyst and a resol type one in which they are condensed using an alkaline catalyst. Among these types of resins, an initial condensate of approximately a dimer or trimer of the novolac type one is preferably used. In this case, it is preferred that resorcinol and formaldehyde are mixed in a mole ratio of between approximately 1:0.5 and 1:1, and that a molecular weight thereof lies between approximately 400 and 700.

Further, the abovementioned resorcinol formaldehyde latex resin can be obtained by adding latex to the resorcinol formaldehyde resin under alkaline conditions, and further adding formaldehyde to increase the condensation point of the resorcinol formaldehyde resin.

As the latex, it is preferable to use a styrene-butadiene copolymer rubber latex, a styrene-butadienevlnylpyridine ternary copolymer latex, or a denatured styrene-butadiene-vinylpyridine ternary copolymer latex, for example.

The thickness of the Drimer layer 3 is not particularly restricted to a specific value, but it is preferred that it lies between approximately 0.1 and 10 µm.

In this regard, it should be noted that instead of the primer layer 3 which is provided for the purpose mentioned above, it is also possible to provide one or more layers for other desired purposes.

The pressure sensitive adhesive layer 4 is provided in order to adhere the information indicator I to the adherend such as a tire (in the unvulcanized state). The pressure sensitive adhesive layer 4 is mainly formed of a pressure sensitive adhesive (or hardenable pressure sensitive adhesive). Suitable examples of such pressure sensitive adhesives are natural rubber based, synthetic rubber based, acrylic resin based, urethane resin based, polyether resin based and silicone resin based adhesives.

The thickness of the pressure sensitive adhesive layer 4 is not particularly restricted to a specific value, but it is preferred that it lies between about 10 and 50 µm.

Materials which can be used for producing the release liner 5 are not particularly restricted to a specific material, and other suitable materials can be used. Examples of materials which can be preferably used for the liner include glassine paper, laminated paper, polyester film, or polypropylene film, which have been subjected to silicone coating.

Figure 2:
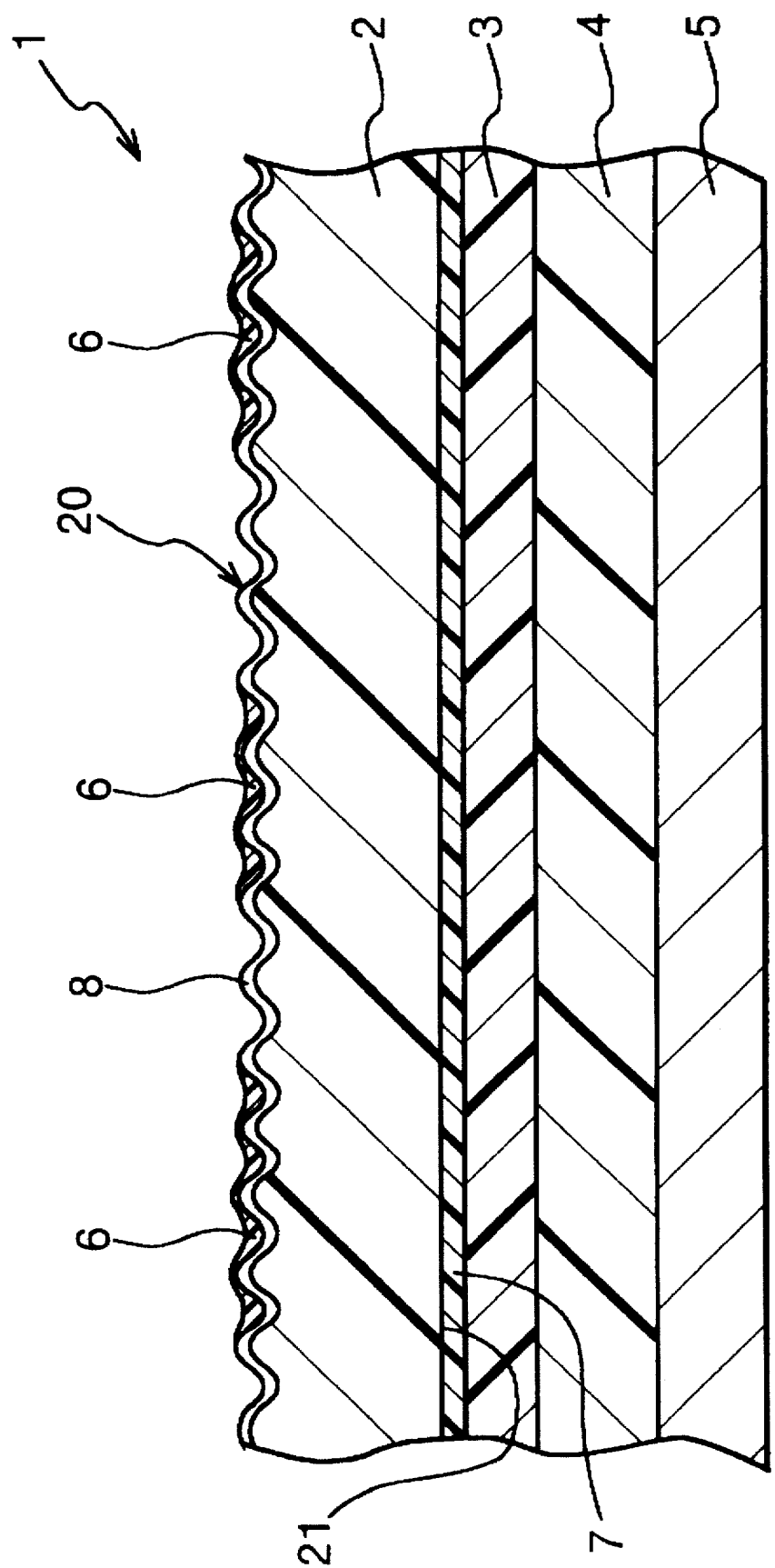
FIG. 2 is an enlarged cross sectional view which shows another embodiment of the information indicator according to the present invention.

FIG. 2 is an enlarged cross sectional view showing another embodiment of the information indicator according to the present invention. The information indicator 10 shown in the figure is the same as the abovementioned information indicator 1 except that the laminating construction is different. A detailed description will now be given for the differences.

In the information indicator 10 shown in FIG. 2, the substrate 2 consists of a transparent film. On the other surface 21 which is on a second side of the substrate 2, there is formed a light-reflecting layer 7. The light-reflecting layer 7 is formed from a thin metal film or white film which reflects light. It is thus possible to improve the recognizability of the indicator 6. The light-reflecting layer 7 in which a thin metal film is employed can be formed, for example, using evapolation, sputtering, ion plating or CVD. Further, the light-reflecting layer 7 employing a white layer is preferably formed by applying a coating agent containing a white pigment as described above and then drying it (so called as a coating method).

Further, in order to improve the adhesivity of the indication 6 to the information indicating surface 20, it is possible to form an adhesivity imparting layer 8 on the information indicating surface 20 which is provided on the first side of the substrate 2. This adhesivity imparting layer 8 function to effectively retain ink to be applied to the information indicating surface 20. In this case, the surface of the adhesivity imparting layer 8 constitutes the information indicating surface 20 in the same manner as stated in the above. Examples of materials which can be preferably used for the adhesivity imparting layer 8 include an ester-type resin, a urethane-type resin or an acrylic-type resin or the like.

The thickness of the adhesivity imparting layer 8 is not limited to a specific value, but it is preferably between approximately 0.1 and 10 µm. Further, the adhesivity imparting layer 8 is preferably formed by the coating method. In this regard, it should be noted that the adhesivity imparting layer 8 can also be made nontransparent, in particular white, by adding a pigment or dye thereinto. In this case, since the adhesivity imparting layer 8 itself contributes to improvements in visibility of the indication 6, the light-reflecting layer 7 may be omitted.

Hereinabove, the description has been made with reference to the respective embodiments of the information indicator according to the present invention shown in the drawings. However, needless to say, the present invention is not limited to these embodiments. Further, the information indicator of the present invention is preferably applied for the information indicating labels to be used in a high-temperature environment. In more details, the information indicator is suitable for production control labels for tires. However, applications of the information indicator of the present invention is not limited to this.

Hereinbelow, the information indicator of the present invention will now be described in greater detail with reference to the experimental examples.

[EXAMPLE 1]

In this example 1, the information indicator according to the present invention is applied to a tire production control label, and the tire production control label having the following structure has been made.

A substrate was formed from a film (thickness 125 µm) made of polyester resin (PET: melting point 256° C.) into which a titanium oxide white pigment had been mingled. One surface of the substrate (information indicating surface)

was subjected to a sand matt processing to form a surface roughness "Ra" (determined in JIS B 0601) of 0.9 μm. On the other surface of the substrate, resorcinol formaldehyde resin was applied at 2 g/m² (dried applied amount), and then it was dried to form a primer layer. Further, a pressure sensitive adhesive layer was formed by applying a pressure sensitive adhesive whose main component was natural rubber onto the primer layer at 25 g/m² (dried applied amount) and then drying it to form a pressure sensitive adhesive layer. Thereafter, a glassine-type release liner was stuck onto the pressure sensitive adhesive layer, thereby forming the tire production control label.

Thereafter, a prescribed bar code was printed onto the information indicating surface of the label using a thermal transfer ink ribbon, thereby forming an indication.

After removing the release liner to expose the pressure sensitive layer, the label was adhered to a nonvulcanized rubber (SBR) through the pressure sensitive adhesive layer. Furthermore, a stainless sheet was placed on the printed surface of the label. Under the condition, the rubber was then vulcanized by heating and pressurizing for 20 minutes at 170° C. and 5 kg/cm².

Thereafter, the sample was cooled to a room temperature, and then the stainless sheet was removed from the printed surface of the label. Under the condition, the printed surface of the label, and the surface of the stainless sheet where it had been in contact with the label, were examined.

In the examination, no phenomena such as blurring, running or erasure of the bar code on the printed surface of the label were seen. Further, even if the printed surface was rubbed by a finger, the bar code did not come off. Furthermore, no transfer of the bar code onto the surface of the stainless sheet where it had been in contact with the label could be seen.

In addition, when the information on the printed surface of the label was read by a bar code reading device, after having been rubbed by a finger, the bar code information could be detected without error.

Further, the adhesive strength of the tire production control label on rubber was measured as follows. Using a tensile testing machine, peeling tests were performed under conditions of peeling angle 90° and peeling rate 300 mm/min. As a result, the rubber which was used as an adherend was ruptured at 7.5 kg/25 mm², but no peeling occurred at the interface between the substrate and the primer layer nor at the interface between the primer layer and the pressure sensitive adhesive layer.

[EXAMPLE 2]

The same tire production control label as in Example 1 was prepared, excepting the following structure of the substrate. Namely, the substrate of this example was formed from a transparent polyester (PET) film (thickness 125 μm). On one surface of the film, which is on the first side thereof, there was formed an adhesivity imparting coating layer which is made of a polyester-type resin. On the other surface of the film, which is on the second side thereof, there was formed a white coating layer. Then, the adhesivity imparting coating layer was subjected to sand matt processing to form an information indicating surface having a surface roughness "Ra" (determined by JIS B 0601) of 1.9 μm. When the same observations and measurements as in Example 1 were performed on the tire production control label having the above structure, the same results were obtained.

[EXAMPLE 3]

The same tire production control label as in Example 1 was prepared, excepting that resorcinol formaldehyde latex resin (dried applied amount 2 g/m²) was used for the primer layer. The same observations and measurements as in Example 1 were performed on the tire production control label. The results showed that the characteristics of the printed surface were satisfactory, as in Example 1, and the bar code information could be read without error.

Further, the adhesive strength of the tire production control label with respect to rubber was also tested under the same condition as in Example 1. As a result, it was confirmed that the rubber, which is an adherend, was ruptured at 8.5 kg/25 mm², and there was no peeling at the interface between the substrate and the primer layer nor at the interface between the primer layer and the pressure sensitive adhesive layer.

[COMPARATIVE EXAMPLE]

A tire production control label was formed in the same way as in the Example 1, excepting that an adhesivity imparting layer (information indicating surface, whose surface roughness "Ra" is 0.1 μm) formed of a polyester-type resin with a thickness of approximately 1 μm was formed on one side of a substrate formed from a polyester (PET) film (thickness 125 μm) into which a titanium oxide-based white pigment had been mingled, and a barcode was formed on the adhesivity imparting layer by printing. For the tire production control label obtained in this way, the same observations were carried out.

The results of the observations showed that the printing of the bar code had been transferred to the stainless plate, while the bar code on the printed surface of the label had run and become blurred, and it became vaguer than before vulcanization. Further, when the information on the printed surface of the label was read by a bar code reading device, errors occurred in the reading, so that it was found that the label was not suitable for practical use.

As described in the above, according to the information indicator of the present invention, since the surface roughness of the information indicating surface is set as desired, it is possible to provide the information indicator which has excellent printing properties with a simple construction, without using a special indicating method or providing a protective layer for covering the indication. Further, the information indicated on the thus constructed information indicator does not blur or run or become erased or transferred even when it is placed in a high-temperature environment or in a high-temperature and pressure environment.

In particular, according to the present invention, since it is not necessary to adhere any covering film or form any protective layer after applying the indications to the information indicating surface, it is possible, for example in the manufacturing process for a tire, to apply the indication to the information indicator using a normal information indicating means such as a printer, at the manufacturing site. With this result, it is possible to perform the process efficiently, and furthermore its scope of application is increased.

Finally, it should be noted that the present invention is not limited to the embodiments described above, and the scope of the present invention will be determined by the following claims.

What is claimed is:

1. An information indicating label for use with unvulcanized rubber from which a rubber molding is formed, consisting essentially of:

a. a single layer film substrate formed of a non-transparent resin to which pigment has been added, the substrate having a first side and a second side which is on the opposite side to the first side, the first side defining an information indicating surface having a surface roughness with an arithmetical mean value of arithmetical mean roughness between about 0.5 and 5 μm, the information indicating surface having information adhered thereto; and b. a pressure sensitive layer provided on said second side of said film substrate.

2. A label for production control of rubber moldings, consisting essentially of:

a. a single layer film substrate formed from a heat-resistant resin to which pigment has been added, the substrate having a first side and a second side which is on the opposite side to said first side; the first side defining an information indicating surface on which an identifiable indication which indicates specified information is printed, wherein microscopic irregularities of a prescribed roughness are formed on said information indicating surface so as to have a surface roughnesses with an arithmetical mean value of arithmetical mean roughness between about 0.5 and 5 microns, in which the size of said irregularities is set such that the indication printed on such information indicating surface is scarcely blurred or erased even under high temperatures and high pressures during vulcanization, and such that the recognizability and detectability of the indication on the rubber molding is not impaired; and b. a pressure sensitive adhesive layer which is provided on said second side of said film substrate, said pressure sensitive adhesive layer being adapted to be adhered to the unvulcanized rubber from which the rubber molding is formed.

3. The label for production control of rubber moldings as claimed in claim 2, wherein said rubber molding is a tire.

4. An information indicator consisting essentially of:

a. a single layer film substrate formed of a non-transparent resin to which pigment has been added, the substrate having a first surface and a second surface opposite the first surface, the first surface defining an information indicating surface having a surface roughness with an arithmetical mean value of arithmetical mean roughness between about 0.5 and about 5 μm; and b. a pressure sensitive layer provided on the second surface of the substrate.

5. The information indicator of claim 4 wherein the pigment has a color selected from the group consisting of white, red, blue, yellow, green, brown, metallic or mixtures thereof.

6. The information indicator of claim 5 further having an indication provided on the information indicating surface with the indication having a color darker than the pigment color.

7. The information indicator of claim 6 wherein the pigment is formed of powdered titanium oxide.

8. The information indicator as claimed in claim 1, wherein said substrate is formed of a heat-resistant resin.

9. The information indicator as claimed in claim 4, further comprising a primer layer provided between said substrate and said pressure sensitive adhesive layer for increasing the adhesive strength therebetween.

10. The information indicator as claimed in claim 4, wherein said information indicating surface has a surface roughness with an arithmetical mean value of arithmetical mean roughness between about 0.7 and 3.5 μm.

* * * * *

UNITED STATES PATENT AND TRADEMARK OFFICE
CERTIFICATE OF CORRECTION

PATENT NO. : 5,709,918
DATED : January 20, 1998
INVENTOR(S) : Takao Kimijima et al.

It is certified that error appears in the above-identified patent and that said Letters Patent is hereby corrected as shown below:

On the Title Page

In column 2, line 5, under "OTHER PUBLICATIONS", please change "vol." to --Vol.--.

In column 2, line 10, under "ABSTRACT", please change "0801" to --0601--.

In claim 8, line 1, please change "claim 1" to --claim 4--.

Signed and Sealed this

Sixteenth Day of January, 2001

Attest:

Q. TODD DICKINSON

Attesting Officer     Commissioner of Patents and Trademarks